United States Patent
Fiore et al.

(10) Patent No.: US 11,635,489 B2
(45) Date of Patent: Apr. 25, 2023

(54) PHASE CALIBRATION OF A RADAR SYSTEM WITH CROSSTALK CANCELLATION

(71) Applicant: Infineon Technologies AG, Neubiberg (DE)

(72) Inventors: Vincenzo Fiore, Linz (AT); Werner Arriola, Linz (AT); Rene Kobler, Linz (AT); Oliver Lang, Linz (AT); Alexander Melzer, Neutillmitsch (AT)

(73) Assignee: Infineon Technologies AG, Neubiberg (DE)

(*) Notice: Subject to any disclaimer, the term of this patent is extended or adjusted under 35 U.S.C. 154(b) by 310 days.

(21) Appl. No.: 16/909,113

(22) Filed: Jun. 23, 2020

(65) Prior Publication Data
US 2021/0025973 A1    Jan. 28, 2021

(30) Foreign Application Priority Data
Jul. 24, 2019 (DE) .......................... 102019119974.3

(51) Int. Cl.
*G01S 7/40* (2006.01)

(52) U.S. Cl.
CPC .......... *G01S 7/4056* (2013.01); *G01S 7/4069* (2021.05)

(58) Field of Classification Search
CPC .............................. G01S 7/4056; G01S 7/4069
See application file for complete search history.

(56) References Cited

U.S. PATENT DOCUMENTS

| | | | |
|---|---|---|---|
| 10,663,559 B2 | 5/2020 | Huemer et al. | |
| 2017/0199270 A1* | 7/2017 | Huemer | G01S 13/343 |
| 2018/0074168 A1* | 3/2018 | Subburaj | G01S 7/038 |
| 2019/0187245 A1* | 6/2019 | Guarin Aristizabal | G01S 13/931 |

FOREIGN PATENT DOCUMENTS

DE    102016120185 A1    4/2018

* cited by examiner

*Primary Examiner* — Peter M Bythrow
*Assistant Examiner* — Nazra Nur Waheed
(74) *Attorney, Agent, or Firm* — Harrity & Harrity, LLP

(57) ABSTRACT

A method for the use in a radar system is described herein. In accordance with one embodiment, the method includes providing a local oscillator signal to an RF output channel of a radar system. The RF output channel is configured to generate, in an enabled state, an RF output signal based on the local oscillator signal. The method further includes determining a first measurement signal based on the local oscillator signal and a first representation of the RF output signal, while the RF output channel is disabled, and thus the first measurement signal represents crosstalk. Further, the method includes determining a second measurement signal based on the local oscillator signal and a second representation of the RF output signal while the RF output channel is enabled. A phase value associated with the RF output channel is determined based on the first measurement signal and the second measurement signal.

16 Claims, 4 Drawing Sheets

(a) crosstalk measurement (b) crosstalk cancellation (i=1, 2, ...)

PHASE CALIBRATION OF A RADAR SYSTEM WITH CROSSTALK CANCELLATION

RELATED APPLICATION

This application claims priority to German Patent Application No. 102019119974.3, filed on Jul. 24, 2019, which is incorporated herein by reference in its entirety.

FIELD

The present disclosure relates to the field of radar sensors, in particular to a novel concept of phase calibration with crosstalk cancellation.

BACKGROUND

Radar sensors can be found in numerous sensing applications in which distances and velocities of objects are to be measured. In the automotive sector, there is an increasing demand for radar sensors that may be used in so-called advanced driver-assistance systems (ADAS). Examples of an advanced driver assistive system are "adaptive cruise control" (ACC) and "radar cruise control" systems. Such systems may be used to automatically adjust the speed of an automobile so as to maintain a safe distance from other automobiles driving ahead. Other examples of advanced driver assistive system are blind-spot monitors, which may employ radar sensors to detect other vehicles in the blind spot of a vehicle. Particularly autonomous cars may use numerous sensors, such as radar sensors, to detect and locate various objects in their surroundings. Information about the position and velocity of objects in the area of an autonomous car is used to help navigate safely.

Modern radar systems make use of highly integrated RF circuits which may incorporate all core functions of an RF font-end of a radar transceiver in one single package (single chip transceiver). Such RF front-ends usually include, inter alia, a local RF oscillator (LO), power amplifiers (PA), low-noise amplifiers (LNA), and mixers. Frequency-modulated continuous-wave (FMCW) radar systems use radar signals whose frequency is modulated by ramping the signal frequency up and down. Such radar signals are often referred to as "chirp signals" or simply as "chirps". A radar sensor usually radiates sequences of chirps using one or more antennas, and the radiated signal is backscattered by one or more objects (referred to as radar targets) located in the "field of view" of a radar sensor. The backscattered signals (radar echoes) are received and processed by the radar sensor. The detection of the radar targets is usually accomplished using digital signal processing.

Modern FMCW radar systems may include multiple input and multiple output channels and are thus referred to as multiple input/multiple output (MIMO) systems. However, in simple systems one input channel and one output channel may be sufficient. The RF front-ends of the radar systems may be distributed across a plurality of semiconductor chips, which are referred to as monolithic microwave integrated circuits (MMICs). Such radar systems are not only capable of measuring distances but also the respective velocities and azimuth angles (also referred to as Direction of Arrival, DoA, of the radar echoes). However, the RF frontend of a radar system may also be integrated in a single MMIC (single chip radar).

Particularly the angle measurement needs a calibration of the phases of the transmitted radar signal in order to obtain the desired accuracy. In known systems crosstalk may negatively affect the quality of the calibration.

SUMMARY

A method for the use in a radar system is described herein. In accordance with one embodiment, the method includes providing a local oscillator signal to an RF output channel of a radar system. The RF output channel is configured to generate, in an enabled state, an RF output signal based on the local oscillator signal. The method further includes determining a first measurement signal based on the local oscillator signal and a representation of the RF output signal, while the RF output channel is disabled, and thus the first measurement signal represents crosstalk. Further, the method includes determining a second measurement signal based on the local oscillator signal and the representation of the RF output signal while the RF output channel is enabled. A phase value associated with the RF output channel is determined based on the first measurement signal and the second measurement signal.

Furthermore, a radar system is described herein. In accordance with one embodiment the radar system includes a local oscillator providing a local oscillator signal to an RF output channel of the radar system. The RF output channel is configured to generate, when in an enabled state, an RF output signal based on the local oscillator signal. Further, the system includes a circuit configured to determine a first measurement signal based on the local oscillator signal and a representation of the RF output signal, while the RF output channel is in a disabled state, whereby the first measurement signal represents crosstalk; the circuit is further configured to determine a second measurement signal based on the local oscillator signal and the a representation of the RF output signal, while the RF output channel is in the enabled state. Further, the system includes a processing unit configured to determining a phase value based on the first measurement signal and the second measurement signal.

BRIEF DESCRIPTION OF THE DRAWINGS

The invention can be better understood with reference to the following drawings and descriptions. The components in the figures are not necessarily to scale; instead emphasis is placed upon illustrating the principles of the invention. In the figures, like reference numerals designate corresponding parts. In the drawings.

DETAILED DESCRIPTION

Figure 1:
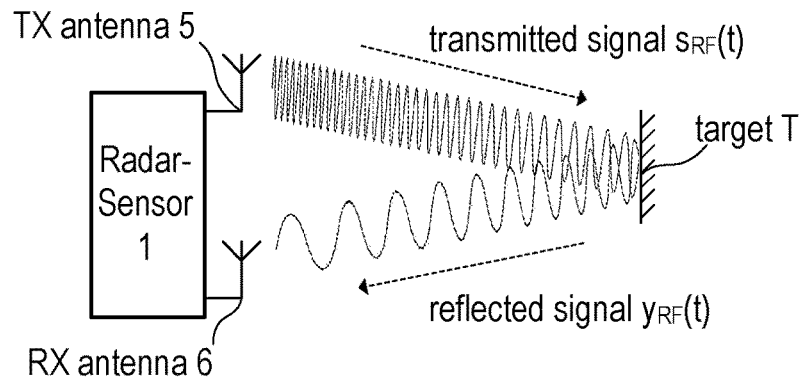
FIG. 1 is a sketch illustrating the operating principle of an FMCW radar system for distance and/or velocity measurement.
Figure 3:
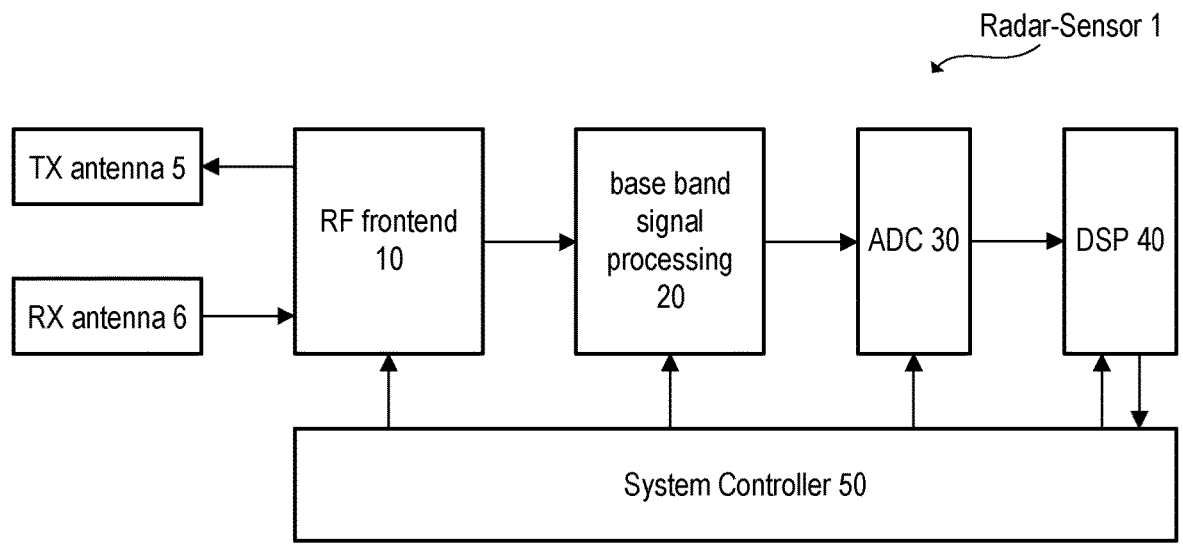
FIG. 3 is a block diagram illustrating the basic structure of an FMCW radar device.

FIG. 1 illustrates a conventional FMCW radar sensor 1. In the present example, separate transmission (TX) and reception (RX) antennas 5 and 6, respectively, are used (bistatic or pseudo-monostatic radar configuration). However, it is noted that a single antenna can be used, so that the reception antenna and the transmission antenna will be physically the same (monostatic radar configuration). The transmission antenna 5 (quasi-) continuously radiates an RF signal $s_{RF}(t)$, which is frequency-modulated, for example, by a saw-tooth-shaped signal. When the radiated signal $s_{RF}(t)$ is back-scattered at an object T, which is located in the field of view of the radar system, the back-scattered RF signal $y_{RF}(t)$ is received by the reception antenna 6. The object T is usually referred to as "radar target". In a more general example, several targets may be in the field of view of a radar sensor. Further, an antenna array may be used instead of a single RX antenna. Similarly, an antenna array may be used instead of a single TX antenna. Using multiple RX and TX antennas in a multi-channel radar system allows for the measurement of the angle of incidence of a radar echo (azimuth angle), usually referred to as direction of arrival (DoA). Measurement of the direction of arrival is important for many applications, and thus most radar sensors will make use of antenna arrays. To keep the drawings simple, only one TX antenna and one RX antenna are shown in FIGS. 1 and 3. It is understood that the concepts described with reference to these figures are readily applicable to radar sensors with multiple input and output channels and respective antenna arrays.

Figure 2:
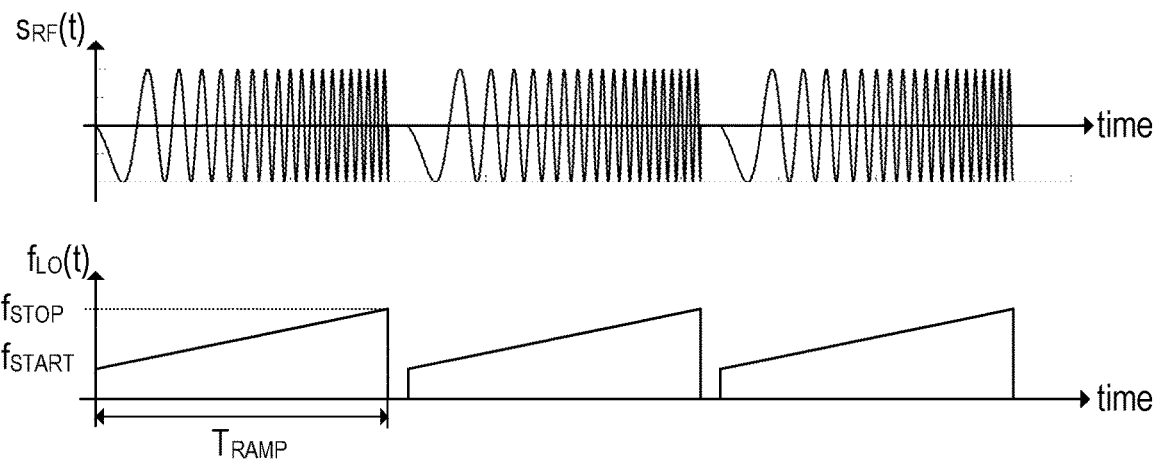
FIG. 2 includes two timing diagrams illustrating the frequency modulation of the RF signal used in FMCW radar systems.

FIG. 2 illustrates the mentioned conventional frequency-modulation of the signal $s_{RF}(t)$. As shown in the top diagram of FIG. 2, the signal $s_{RF}(t)$ is composed of a sequence of "chirps", i.e. sinusoidal waveforms with increasing (up-chirp) or decreasing (down-chirp) frequency. In the present example, the instantaneous frequency $f_{LO}(t)$ of a chirp increases linearly from a start frequency $f_{START}$ to a stop frequency $f_{STOP}$ within a defined time span $T_{RAMP}$ (see bottom diagram of FIG. 2). Such a chirp is also referred to as linear frequency ramp. A frequency-modulated signal with a sequence of three identical linear frequency ramps is illustrated in FIG. 2. It is noted, however, that the parameters $f_{START}$, $f_{STOP}$, $T_{CHIRP}$ as well as the pause between the individual frequency ramps may vary dependent on the actual implementation of the radar device 1 and may also vary during operation of the radar device. For one radar measurement a ramp sequence of, e.g., 256 or 512 frequency ramps may be used.

FIG. 3 is a block diagram that illustrates an exemplary structure of radar sensor 1. Accordingly, at least one transmission antenna 5 (TX antenna(s)) and at least one reception antenna 6 (RX antenna(s)) are connected to an RF frontend 10, which may be integrated in a single semiconductor chip, usually referred to as monolithic microwave integrated circuit (MMIC). As mentioned, the RF circuitry may also be distributed across more than one chip. The RF frontend 10 may include all the circuit components needed for RF signal processing. Such circuit components may include, for example, a local oscillator (LO), RF power amplifiers, low noise amplifiers (LNAs), directional couplers such as rat-race-couplers and circulators, and mixers for the down-conversion of RF signals (e.g. the received signal $y_{RF}(t)$, see FIG. 1) into the base-band or IF-band. As mentioned, antenna-arrays may be used instead of single antennas. The depicted example shows a bistatic (or pseudo-monostatic) radar system, which has separate RX and TX antennas. In case of a monostatic radar system, a single antenna or a single antenna array may be used for both, receiving and transmitting electromagnetic (radar) signals. In this case a directional coupler (e.g. a circulator) may be used to separate RF signals to be transmitted to the radar channel from RF signals received from the radar channel.

In the case of an FMCW radar sensor, the RF signals radiated by the TX antenna 5 may be in the SHF (Super High Frequency) or the EHF (Extremely High Frequency) band, e.g. in the 24 GHz ISM band or in the range of e.g. about 76-81 GHz in automotive applications. As mentioned, the RF signal received by the RX antenna 6 includes the radar echoes, i.e. the signals that have been back-scattered at the radar target(s). The received RF signal $y_{RF}(t)$ is down-converted into the base-band and further processed in the base-band using analog signal processing (see FIG. 3, base-band signal processing chain 20), which basically includes filtering and amplification of the base-band signal and thus determines the bandwidth of the received signal. The base-band signal is finally digitized using one or more analog-to-digital converters 30 and further processed in the digital domain (see FIG. 3, digital signal processing chain implemented, e.g., in digital signal processor 40). The overall system is controlled by a system controller 50, which may be at least partly implemented using a processor executing appropriate software/firmware. The processor may be included, e.g. in a microcontroller, a digital signal processor, or the like. The digital signal processor 40 (DSP) may be part of the system controller 50 or separate therefrom. The RF frontend 10 and the analog base-band signal processing chain 20 and optionally the also the ADC 30 as well as part of the digital signal processing may be integrated in a single MMIC. However, the components may be distributed among two or more integrated circuits.

Figure 4:
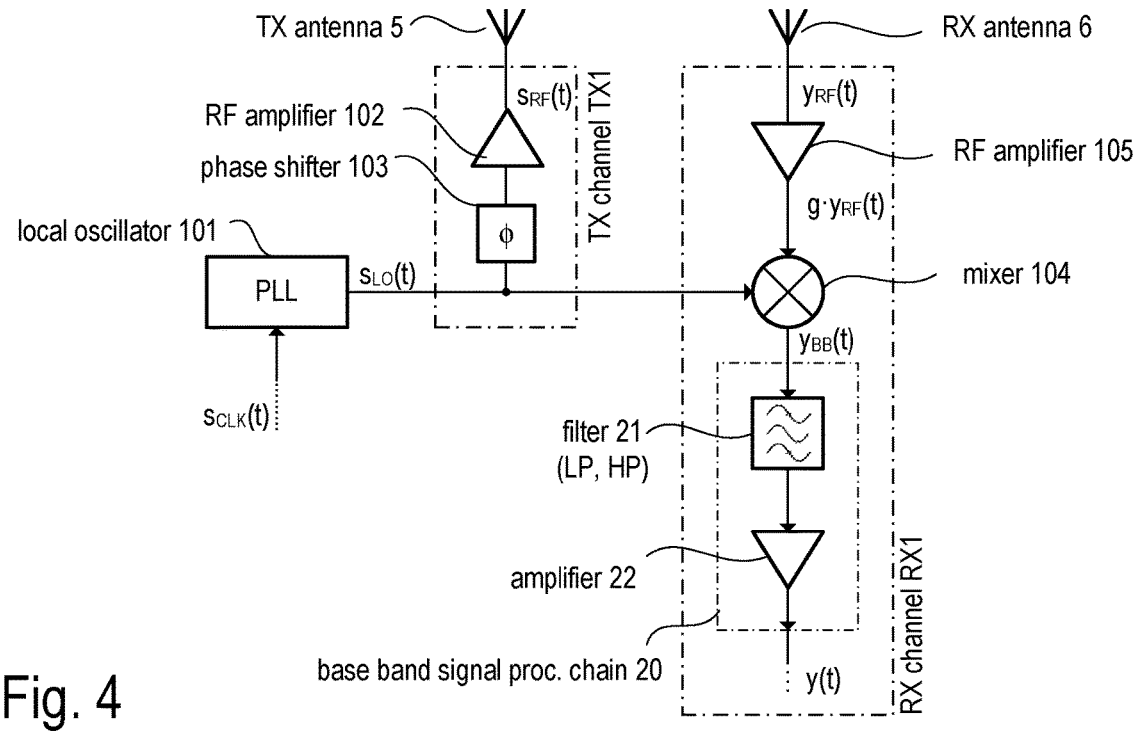
FIG. 4 is a circuit diagram illustrating one example of an analog RF frontend, and analog base-band signal processing.

FIG. 4 illustrates one exemplary implementation of the RF frontend 10, which may be included in the radar system shown in FIG. 3. It is noted that FIG. 4 is a simplified circuit diagram illustrating the basic structure of an RF frontend. Actual implementations, which may heavily depend on the application, are of course more complex and may include several RX channels (input channels) and/or TX channels (output channels) in a single MMIC. The RF frontend 10 includes a local oscillator 101 (LO) that generates a RF signal $s_{LO}(t)$, which may be frequency-modulated as explained above with reference to FIG. 2. The signal $s_{LO}(t)$ is also referred to as LO signal. Usually, the local oscillator 101 includes a phase-locked loop which is clocked by a clock signal $s_{CLK}(t)$.

The LO signal $s_{LO}(t)$ is processed in the transmission signal path as well as in the reception signal path. The transmission signal $s_{RF}(t)$ (outgoing radar signal), which is radiated by the TX antenna 5, is generated by amplifying the LO signal $s_{LO}(t)$, e.g., using an RF power amplifier 102. The output of the amplifier 102 is coupled to the TX antenna 5. The RF signal processing chain coupled between the local oscillator 101 and a particular TX antenna is referred to as TX channel or RF output channel, which is labelled TX1 in the example of FIG. 4. In order to adjust the phase of the outgoing radar signal $s_{RF}(t)$ the respective output channel TX1 includes a phase shifter 103, which may be coupled between an input circuit node of the output channel TX1 (at which the LO signal $s_{LO}(t)$ is received) and the RF amplifier 102. The phase shifter 103 may also be placed after RF amplifier 102 or may be a part of RF amplifier 102. An RF output channel may be enabled or disabled, e.g. by enabling or disabling the RF amplifier 102.

The received signal $y_{RF}(t)$ (incoming radar signal), which is provided by the RX antenna 6, is directed to a mixer 104. In the present example, the received signal $y_{RF}(t)$ (i.e. the antenna signal) is pre-amplified by RF amplifier 105 (gain g), so that the mixer receives the amplified signal $g \cdot y_{RF}(t)$ at its RF input port. The mixer 104 further receives the LO signal $s_{LO}(t)$ at its reference input port and is configured to down-convert the amplified signal $g \cdot y_{RF}(t)$ into the base band. The resulting base-band signal at the mixer output is denoted as $y_{BB}(t)$. The base-band signal $y_{BB}(t)$ is further processed by the analog base band signal processing chain 20 (see also FIG. 3), which basically includes one or more filters (e.g. a band-pass 21 or a combination of high pass and low pass filters) to remove undesired side bands and image frequencies as well as one or more amplifiers such as amplifier 22. The analog output signal, which may be supplied to an analog-to-digital converter (cf. FIG. 3), is denoted as y(t). Various techniques for the digital post-processing of the digitized output signals (digital radar signal) are as such known (e.g. Range Doppler Analysis) and thus not further explained herein. The RF signal processing chain coupled between a particular RX antenna and the ADC that provides the respective digital base band signal is referred to as RX channel or RF input channel, which is labelled RX1 in the example of FIG. 4.

In the present example, the mixer 104 down-converts the RF signal $g \cdot y_{RF}(t)$ (amplified antenna signal) into the base band. The respective base band signal (mixer output signal) is denoted by $y_{BB}(t)$. The down-conversion may be accomplished in a single stage (i.e. from the RF band into the base band) or via one or more intermediate stages (from the RF band into an intermediate frequency band and subsequently into the base band).

Figure 5:
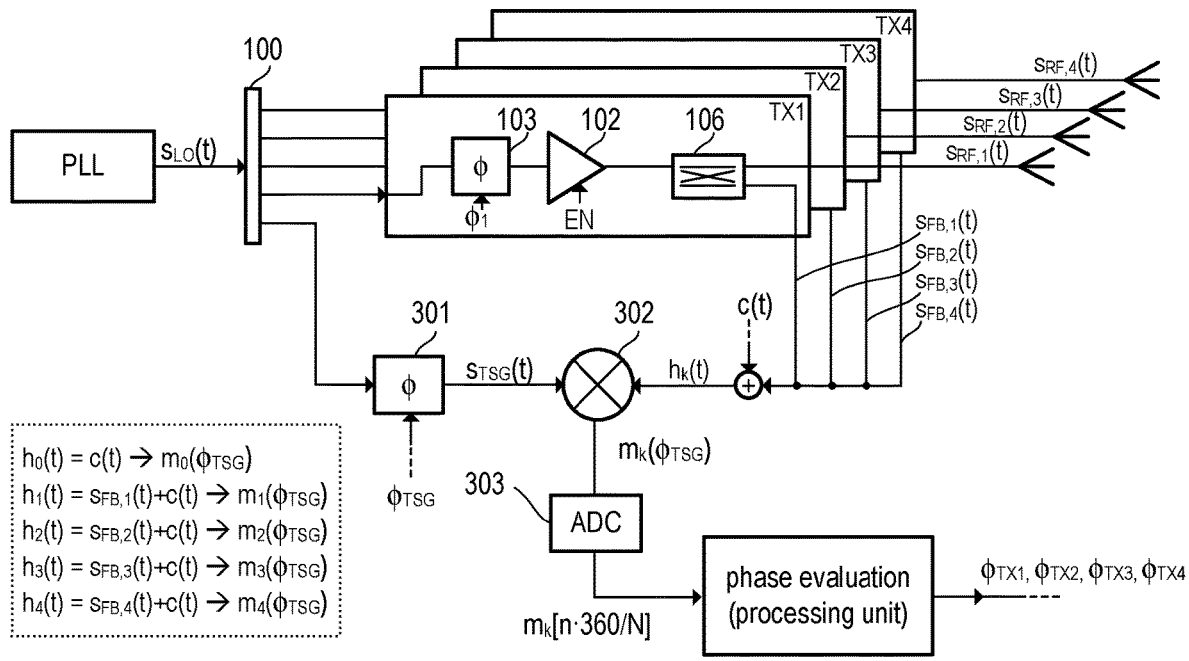
FIG. 5 is a circuit diagram illustrating a radar system with a plurality of RF output channels and a monitoring circuit for measuring the phases of the RF output signals of the RF output channels.

FIG. 5 illustrates one example of a radar system with more than one RF output channel, wherein the RF input channels, which are not necessary for the further discussion have been omitted to simplify the illustrations. It is understood, that the RX channels of the radar systems described below may be implemented as shown, for example, in FIG. 4. According to FIG. 5, the radar system includes a local oscillator 101 and four RF output channels TX1, TX2, TX3, and TX4. Each one of the RF output channels TX1, TX2, TX3, and TX4 receives the LO signal $s_{LO}(t)$ and is configured to generate—in an enabled state—an RF output signal $s_{RF,1}(t)$, $s_{RF,2}(t)$, $s_{RF,3}(t)$, and, respectively, $s_{RF,4}(t)$ based on the local oscillator signal $s_{LO}(t)$). The RF output channels TX1, TX2, TX3, and TX4 may be implemented similar to the output channel TX1 in the example of FIG. 4.

The RF output channels TX1, TX2, TX3, and TX4 are configured to be enabled or disabled, which may be done by enabling and disabling the power amplifier 102 and/or the phase shifter 103 included in each RF output channel. The LO signal $s_{LO}(t)$ is distributed to the RF output channels TX1, TX2, TX3, and TX4 by the signal distribution circuit 100, which may be implemented, for example, using one or more RF power divider circuits, strip lines and other RF circuit components. Although not shown in the example of FIG. 6, the signal distribution circuit 100 may also be configured to provide the LO signal $s_{LO}(t)$ to the RF input channels (RX channels, not shown in FIG. 5). Furthermore, each RF output channels TX1, TX2, TX3, and TX4 is configured to provide a representation of the respective RF output signals $s_{RF,1}(t)$, $s_{RF,2}(t)$, $s_{RF,3}(t)$, $s_{RF,4}(t)$. For this purpose, each RF output channel TX1, TX2, TX3, and TX4 includes a coupler 106 (e.g. a directional coupler such as a rat race coupler, a coupled-line directional coupler, or the like) which is arranged between the amplifier output 102 and the RF output port, which forms basically an interface to the antenna. The coupler 106 directs the RF output signal $s_{RF,1}(t)$, $s_{RF,2}(t)$, $s_{RF,3}(t)$, $s_{RF,4}(t)$ to the respective output port and also provides a representation of the respective RF output signal, which is herein also referred to as feedback signal $s_{FB,1}(t)$, $s_{FB,2}(t)$, $s_{FB,3}(t)$, and $s_{FB,4}(t)$. The RF output signals $s_{RF,k}(t)$ and the respective feedback signals $s_{FB,k}(t)$ (with k=1, . . . , 4) have a fixed phase relation and differ in amplitude. That is, the feedback signals are scaled and phase shifted (with a fixed offset) versions of the respective RF output signals, and, when the phase of the RF output signals $s_{RF,k}(t)$ change, then the phases of the respective feedback signals will change accordingly. In other words, the phase of a feedback signal is indicative of the phase of the respective RF output signal. The antennas connect to the respective RF output ports at chip contacts which may be solder balls or the like dependent on the chip package used.

Particularly in radar systems with more RF output channels the phases of the RF output signals al $s_{RF,1}(t)$, $s_{RF,2}(t)$, $s_{RF,3}(t)$, $s_{RF,4}(t)$ need to be calibrated in order to improve the quality and accuracy of measurements (particularly DoA measurements). In this regard it should be noted that the phase may vary, for example, due to temperature variations, aging effects, etc. Therefore, a monitoring of the phases and a regular calibration may be desirable.

To determine a phase a reference phase is usually needed, and, in the present example, the reference phase is the phase $\phi_{LO}$ of the LO signal $s_{LO}(t)$. In the example of FIG. 5, to obtain a measurement signal which is indicative of the phase $\phi_{TXk}$ of the RF output signal $s_{RF,k}(t)$ of channel TXk (k=1, . . . , 4), the representation of the RF output signal $s_{RF,k}(t)$ (i.e. the feedback signal $s_{FB,k}(t)$) is mixed with the LO signal $s_{LO}(t)$ using a mixer 302, wherein an additional phase shift is imposed on the LO signal $s_{LO}(t)$. This additional phase shift is referred to as test phase $\phi_{TSG}$, which can be set by phase shifter 301, which receives a control input indicative of the desired test phase $\phi_{TSG}$. It is noted that, when the feedback signal $s_{FB,k}(t)$) is a sine signal with a specific frequency $f_{LO}$ and phase $\phi_{TXk}$, and the LO signal $s_{LO}(t)$ is a sine signal with the same frequency $f_{LO}$ and phase $\phi_{LO}$, then the mixer output signal will be a DC signal with a signal level indicative of the phase $\phi_{TXk}$ (relative to the phase $\phi_{LO}$). In essence, the mixer output signal will be indicative of the phase difference $\phi_{TXk} - \phi_{LO}$, wherein $\phi_{LO}$ may be defined as zero for the current discussion without loss of generality. The mixer output signal is referred to as measurement signal $m_k(\phi_{TSG})$; it depends on the setting of the test phase $\phi_{TSG}$ and the index k corresponds to the output channel TXk which is enabled during the measurement. k=0 means that none of the RF output channels is enabled during a phase measurement.

Only one selected RF output channel, e.g. TX1, is enabled for a measurement of the respective phase, e.g. $\phi_{TX1}$, wherein the other RF output channels (TX2-TX4 in the present example) are disabled. In the following the phase measurement is explained in more detail for RF output channel TX1. It is understood that the same procedure can be done for the other RF output channels TX2-TX4. In practice, the feedback signal $s_{FB,1}(t)$) will be distorted by crosstalk when arriving at the RF port of the mixer 302. The distorted feedback signal is denoted as $h_1(t)$ and generally as $h_k(t)$ with k=1, . . . , 4 for the channels TX1-TX4. Accordingly, the feedback signal including crosstalk can be written as:

$$h_1(t) = s_{RF,1}(t) + c(t), \quad (1)$$

wherein c(t) denotes the crosstalk which is also a sine signal with the same frequency as the LO signal $s_{LO}(t)$ and therefore may disturb the measurement of phase $\phi_{TX1}$. When the second channel TX2 is enabled (and all other channels disabled), the feedback signal including crosstalk can be written as:

$$h_2(t)=s_{RF,2}(t)+c(t), \quad (2)$$

and, similarly, for the third and the fourth channel TX3 and TX4, respectively.

$$h_3(t)=s_{RF,3}(t)+c(t), \quad (3)$$

$$h_4(t)=s_{RF,4}(t)+c(t), \quad (4)$$

It is clear from equation (1) that the crosstalk c(t) contributes to the measured phase $\phi_{TX1}$ and thus causes a measurement error. The concept developed herein provides a crosstalk cancellation before the actual calculation of the sought phase value $\phi_{TX1}$. The concept is illustrated by the phasor diagrams of FIG. 6, which illustrate the signals $s_{RF,1}(t)$ and c(t) and $h_1(t)$ as complex-valued phasors $s_{RF,1}^*(t)$ and, respectively $c^*(t)$. The angle between the real axis and the phasor represents the phase of the respective signal. It is noted that the representation of sinusoidal signals by phasors is well-known and thus not further explained here. When disabling all RF output signals TX1-TX4 the mixer 302 only receives the crosstalk which is also denoted as $$h_0(t)=c(t). \quad (5)$$

Generally, the feedback signal arriving at the mixer 302 is denoted as $h_k(t)$. As mentioned, an index k=0 refers to a situation in which all RF output channels are disabled, whereas k=1, 2, 3, 4 refers to the channels TX1, TX2, TX3 or TX4 enabled, respectively. The corresponding measurement signal is denoted as $m_k(\phi_{TSG})$. As mentioned, for a single specific test phase value $\phi_{TSG}$, $m_k(\phi_{TSG})$ represents a DC signal. However, when acquiring several samples of the measurement signal $m_k(\phi_{TSG})$ for different test phase values $\phi_{TSG}$, the resulting discrete signal (sequence of samples) represents amplitude and phase of the corresponding feedback signal $h_k(t)$.

Figure 6:
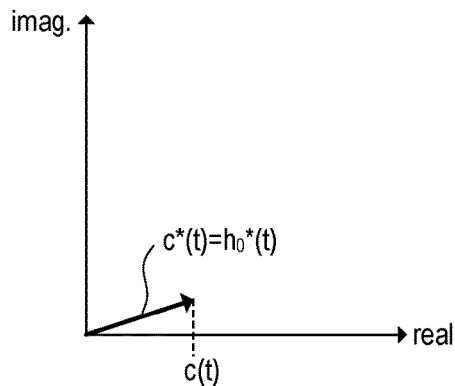
FIG. 6 illustrates the superposition of crosstalk and a representation of the RF output signal of an RF output channel as an addition of complex phasors.
Figure 6:
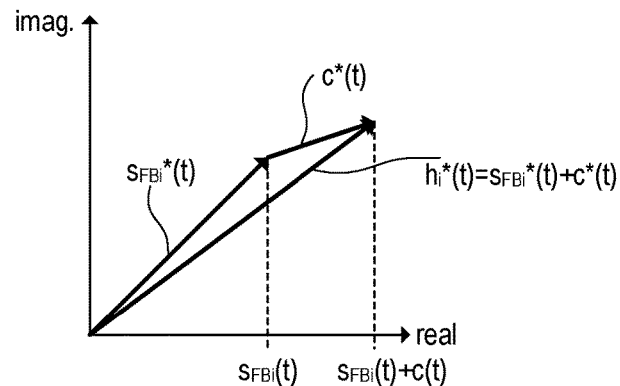

The crosstalk signal $h_0(t)=c(t)$ is illustrated in the left diagram of FIG. 6. The corresponding measurement signal $m_0(\phi_{TSG})$ provided by the mixer 302 is indicative of the crosstalk (amplitude and phase). In a second measurement, e.g., channel TX1 is enabled and the mixer 302 receives the superposition $h_1(t)=c(t)+s_{FB,1}(t)$ of crosstalk c(t) and feedback signal $s_{FB,1}(t)$ this superposition is illustrated in the right diagram of FIG. 6. The respective measurement signal $m_1(\phi_{TSG})$ provided by the mixer 302 is indicative of the superposition 'feedback signal plus crosstalk' (i.e amplitude and phase of the distorted feedback signal $h_1(t)$). The same can be done for the remaining RF output channels and the respective feedback signals.

In the right diagram of FIG. 6 one can see that a (theoretically) correct crosstalk cancellation can be achieved by subtracting the crosstalk phasor $c^*(t)$ from the phasor representing the distorted feedback signal $h_1^*(t)$. At this point it should be noted that it is not enough to simply subtract the phase of the crosstalk (see FIG. 6, left diagram, phasor c*) from the phase of the distorted feedback signal (see FIG. 6, left diagram, phasor $h_1^*$). To obtain a correct cancellation, the complex phasors must be considered.

Referring again to FIG. 5 it is noted that the subtraction of the crosstalk can be done in the base band. As mentioned, the measurement signals/mixer output signals $m_k(\phi_{TSG})$ are DC signals which can easily be sampled, digitized and stored for different values of $\phi_{TSG}$. Accordingly, the measurement signal $m_0(\phi_{TSG})$ that represents the crosstalk (and is obtained when all output channels are disabled) can be stored for a sequence of different test phases $\phi_{TSG}$ and used later in the calculation of the sought phase $\phi_{TX1}$.

The process of the acquisition of a measurement signal $m_k(\phi_{TSG})$ is further explained below with reference to FIG. 7. In the present example the test phase $\phi_{TSG}$ is varied in steps of 45° from 0° to 315° which corresponds to a full rotation of the phase; a further step of 45° would result in a phase of 360° which would be the start of the next rotation. That is, the test phase $\phi_{TSG}$ can be expressed as $$\phi_{TSG}[n]=n\cdot 360/N, \text{ for } n=0,\ldots,N-1, \quad (6)$$

wherein N describes the length of the sequence and thus the number of samples obtained for the measurement signal $m_k(\phi_{TSG})$, which can also be written as discrete signal $m_k[n\cdot 360/N]$. In the example of FIG. 7, the number of samples is N=8. The phase of the discrete signals $m_k[n\cdot 360/N]$ represents the phase of the signal $h_k(t)$.

Figure 7:
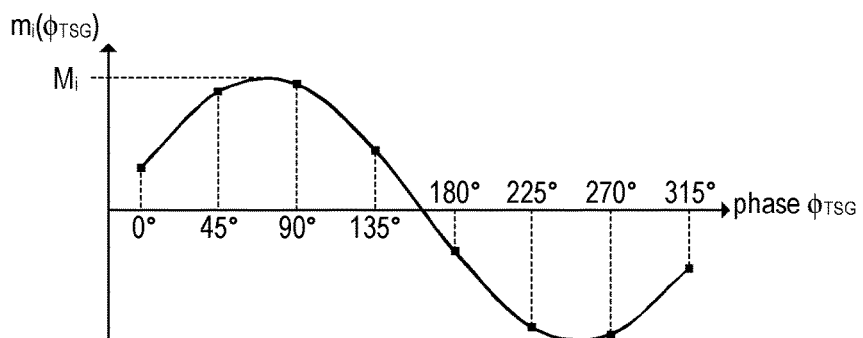
FIG. 7 illustrates one example of a measurement signal.
Figure 8:
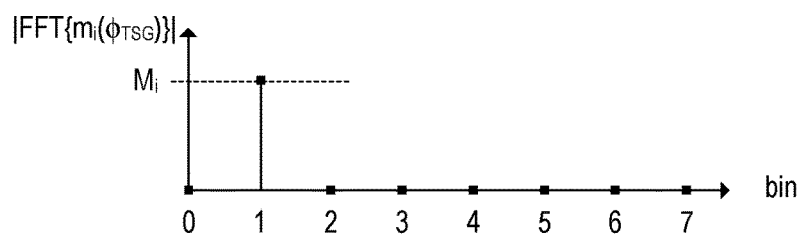
FIG. 8 illustrates the discrete spectrum of the measurement signal.

In the example of FIG. 7, the phase $\phi_{TSG}$ is varied in equidistant phase steps $\Delta\phi=360/N$ until a full phase rotation has been reached. In other words, the N samples of $m_k[n\cdot 360/N]$ may be regarded as exact one period of a periodic sinusoidal discrete signal and, therefore, the Discrete Fourier Transform of $m_k[n\cdot 360/N]$ yields a sequence $M_k[m]$ (for m=0, ... N-1), in which all samples are zero except the spectral value $M_k[1]$. One example of such a sequence of spectral values (also referred to as spectral lines) is shown in FIG. 8.

It is understood that the spectral value $M_k[1]$ of the sequence $$M_k[m]=DFT\{m_k[n\cdot 360/N]\} \quad (7)$$

is a complex value having a magnitude $|M_k[1]|$ and an argument $\arg\{M_k[1]\}$. If the phase of the $\phi_{TX1}$ of the RF output signal $s_{RF,1}(t)$ of the RF output channel TX1 is calculated based on the difference $m_1[n\cdot 360/N]-m_0[n\cdot 360/N]$, then the effect of the crosstalk is cancelled. As the Discrete Fourier Transform is a linear operation, this difference may be calculated before or after the Fourier transform. That is, $$\phi_{TX1}=\arg\{DFT\{m_1[n\cdot 360/N]-m_0[n\cdot 360/N]\}|_{m=1}\}, \text{ or} \quad (8)$$

$$\phi_{TX1}=\arg\{M_1[1]-M_0[1]\}, \quad (9)$$

wherein $|_{m=1}$ means that only the sample with index m=1 is considered when calculating the argument. The same can be done for the other RF output channels TX2, TX3, TX4.

The Discrete Fourier Transform may be implemented using the well-known Fast Fourier Transform (FFT) algorithm. However, other algorithms are known to calculate the spectral values $M_k[1]$. It is noted that, according to the examples described herein, the crosstalk can be represented by a single complex number, namely $M_0[1]$, which can be stored in a memory and later used to cancel the crosstalk component in the calculations of the phases $\phi_{TX1}$, e.g. according to equation 9, which may be generalized to $$\phi_{TXk}=\arg\{M_k[1]-M_0[1]\}, \text{ for } k=1,2,\text{etc.} \quad (10)$$

The complex-valued difference $M_k[1]-M_0[1]$ corresponds to the subtraction of the phasors $h_k^*(t)-c^*(t)$ illustrated in the right diagram of FIG. 6. However, the difference $M_k[1]-M_0[1]$ is determined using base-band signals instead of RF signals. If the crosstalk cancellation is done before the Discrete Fourier Transform in accordance with equation 8, then the crosstalk is, alternatively, represented by N real values, namely $m_0[n\cdot 360/N]$ for n=0, ... N-1, (instead of by a single complex number) which can also be stored in a memory and later used for crosstalk cancellation.

The concept for phase measurement of the phases $\phi_{TX1}$, $\phi_{TX2}$, $\phi_{TX3}$, $\phi_{TX4}$ of the RF output signals $s_{RF,1}(t)$, $s_{RF,2}(t)$, $S_{RF,3}(t)$, $s_{RF,4}(t)$ of the RF output channels TX1, TX2, TX3, and TX4, respectively, are further described below with reference to the flow chart of FIG. 9. According to the embodiment illustrated by FIG. 9, the method includes providing a local oscillator signal $s_{LO}(t)$ to an RF output channel TX1 of a radar system (see FIG. 9, step S1). The RF output channel is configured to generate, in an enabled state, an RF output signal $s_{RF,1}(t)$ based on the local oscillator signal $s_{LO}(t)$.

Figure 9:
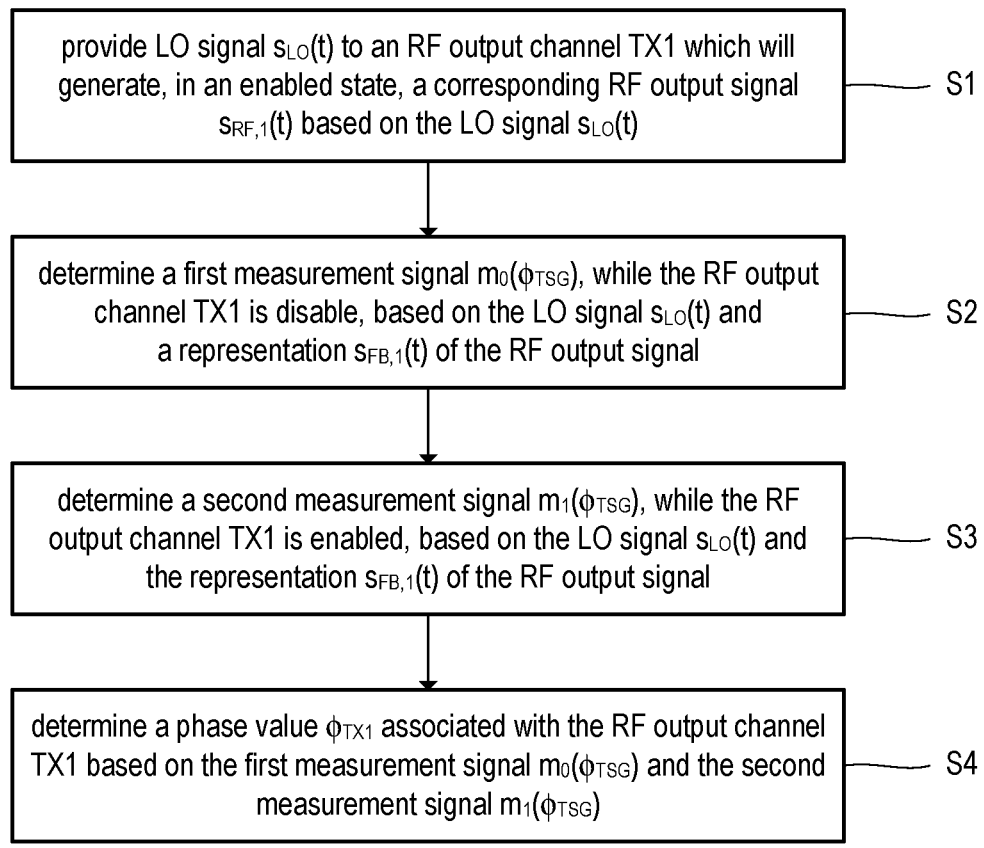
FIG. 9 is a flow chart illustrating one exemplary embodiment of the phase measurement described herein.

The method illustrated by FIG. 9 further includes determining a first measurement signal $m_0(\phi_{TSG})$ (see also FIG. 7) based on the local oscillator signal $s_{LO}(t)$ and a representation (denoted $S_{FB,1}(t)$) of the RF output signal $s_{RF,1}(t)$, while the RF output channel TX1 is disabled (see FIG. 9, step S2). In this situation, as the RF output channel TX1 is disabled (as well as all other RF output channels if present), the first measurement signal $m_0(\phi_{TSG})$ represents merely crosstalk c(t). The method further includes determining a second measurement signal $m_1(\phi_{TSG})$ based on the local oscillator signal $s_{LO}(t)$ and the representation ($s_{FB,1}(t)$) of the RF output signal $s_{RF,1}(t)$, while the RF output channel TX1 is enabled (see FIG. 9, step S2). In this situation, the second measurement signal $m_1(\phi_{TSG})$ represents the RF output signal $s_{RF,1}(t)$ and crosstalk c(t).

The method further includes determining a phase value $\phi_{TX1}$ associated with the RF output channel TX1 based on the first measurement signal $m_0(\phi_{TSG})$ and the second measurement signal $m_1(\phi_{TSG})$ (see FIG. 9, step S4). Determining the phase value $\phi_{TX1}$ may include a crosstalk cancellation as explained in detail above (see, for example, equations 7 and 10). Accordingly, a test signal $s_{TSG}(t)$ is generated based on the local oscillator signal $s_{LO}(t)$, wherein either the test signal $s_{TSG}(t)$ or the representation $s_{FB,1}(t)$ of the RF output signal $s_{RF,1}(t)$ is phase shifted by a by a test phase $\phi_{TSG}$ (see FIG. 5, phase shifter 301). In other words, an additional phase shift equal to the test phase $\phi_{TSG}$ is generated between the test signal $s_{TSG}(t)$ and the representation $s_{FB,1}(t)$ of the RF output signal $s_{RF,1}(t)$ and, subsequently, the test signal $s_{TSG}(t)$ and the representation $s_{FB,1}(t)$ of the RF output signal ($s_{RF,1}(t)$) are mixed (see FIG. 5, mixer 302), while the RF output channel TX1 is disabled (as well as any other RF output channels if present). Accordingly, the mixer 302 receives only the test signal $s_{TSG}(t)$ and crosstalk signal $h_0(t)=c(t)$, wherein the test phase $\phi_{TSG}$ is imposed either on the test signal $s_{TSG}(t)$ or the crosstalk signal $h_0(t)$. The first measurement signal $m_0(\phi_{TSG})$ is determined by sampling the mixer output signal for various test phases $\phi_{TSG}$, while the RF output channel TX1 (and all other RF output channels if present) are disabled. The second measurement signal $m_1(\phi_{TSG})$ is determined in the same way wherein, however, the RF output channel TX1 is enabled (while all other RF output channels, if present, remain disabled). Similarly, a third measurement signal $m_2(\phi_{TSG})$ may be determined, if (at least) a second RF output channel TX2 is present. In this case the RF output channel TX2 will be enabled while all other RF output channels are disabled. This procedure can be repeated for an arbitrary number of RF output channels.

As explained in detail above, the crosstalk compensation may be achieved by subtracting the measurement signal $m_0(\phi_{TSG})$, which represents the crosstalk, from the other measurement signals $m_k(\phi_{TSG})$ (k=1, 2, . . . , for channels TXk). As discussed above, this difference may also be calculated in the frequency domain. The sought phase $\phi_{TXk}$ associated with the RF output channel TXk is then calculated based on a spectral line associated with the difference signals $m_k(\phi_{TSG})-m_0(\phi_{TSG})$.

In the examples described above, the measurement signals $m_0(\phi_{TSG})$, $m_1(\phi_{TSG})$, $m_2(\phi_{TSG})$, etc. have been recorded by sampling the mixer output signal for different test phases $\phi_{TSG}$, wherein the test phase is increased, starting at 0° by a constant increment of, e.g. 360°/N, wherein N is the number of samples recorded for each measurement signal $m_0(\phi_{TSG})$, $m_1(\phi_{TSG})$, etc. Accordingly, the test phases, at which the mixer output signal is samples, form a sequence that can be written as $\phi_{TSG}=n\cdot 360°/N$, for $n=0, \ldots, N-1$, and that covers exactly one full rotation of the phase $\phi_{TSG}$, i.e. the interval [0°, 360°). In this case, the second bin with index m=1 of the resulting discrete spectrum $M_k[m]$ is used for calculating the phase $\phi_{TXk}$ (see equation 10). Alternatively, the phase $\phi_{TSG}$ may be varied in constant steps over two or more full rotations; for two full rotations the sequence can be written as $\phi_{TSG}=n\cdot 720°/N$, for $n=0, \ldots, N-1$, wherein, in this case, the third bin with index m=2 of the resulting discrete spectrum $M_k[m]$ is used for calculating the phase $\phi_{TXk}$ (analogous to equation 10 but for m=2). Generally, the phase $\phi_{TSG}$ may be varied in constant steps R full rotations resulting in a sequence that can be written as $\phi_{TSG}=n\cdot R\cdot 360°/N$, for $n=0, \ldots, N-1$, wherein R is an integer number equal to or greater than 1. In this case, the $(R+1)^{th}$ bin with index m=R of the resulting discrete spectrum $M_k[m]$ is used for calculating the phase $\phi_{TXk}$ (analogous to equation 10 but for m=R).

It is understood that the calculations needed for crosstalk cancellation and all related calculations (such as, e.g. for calculating the Fourier Transform), may be performed by a processing unit, which may be included in, for example, the signal processor 40 or the system controller 50 (see FIG. 3). However, this is not necessarily the case. Generally, the term processing unit may be any entity that is capable of performing the herein-described functions and calculations. Accordingly, the processing unit may include a processor that is capable of executing software/firmware instructions that cause to processor to perform the calculations described herein for crosstalk cancellation, phase measurement and related functions. Additionally, or alternatively, the processing unit may include hard-wired circuitry which is configured to perform calculations without the need for software/firmware instructions. For example, the radar system may include hard-wired circuits that are capable of performing a Fast Fourier Transform.

Once the phase values $\phi_{TX1}$, $\phi_{TX2}$, $\phi_{TX3}$, and $\phi_{TX4}$ have been determined using the crosstalk compensation technique as explained in detail above, the phase shifts provided by the respective RF output channels TX1, TX2, TX3, and TX4 may be adjusted dependent on the determined phase values $\phi_{TX1}$, $\phi_{TX2}$, $\phi_{TX3}$, and $\phi_{TX4}$. The phase shifts provided by the respective RF output channels TX1, TX2, TX3, and TX4 can be adjusted by adjusting the phase shift $\phi_1$, $\phi_2$, $\phi_3$, and $\phi_4$ effected by the phase shifters 103 included in the respective RF output channels (see FIG. 5, phase shift $\phi_1$ effected by phase shifter 103 of channel TX1). It is understood that the phase shifters 103 as well as the phase shifter 301 may be controlled by the system controller 50 (see FIG. 3). Dependent on the application, one or more of the phase shifts $\phi_1$, $\phi_2$, $\phi_3$, and $\phi_4$ effected by the phase shifters 103 (of channels TX1-TX4) may be adjusted in way that the differences $\phi_{TX2}-\phi_{TX1}$, $\phi_{TX3}-\phi_{TX2}$, and $\phi_{TX4}-\phi_{TX3}$ match predetermined desired phase differences. It is understood that the concepts described herein can be directly generalized to more than four output channels.

Although the concept described herein has been illustrated and explained with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the invention.

What is claimed is:

1. A method, comprising:
providing a local oscillator signal to an RF output channel of a radar system, the RF output channel being configured to generate, in an enabled state, an RF output signal based on the local oscillator signal;
determining a first measurement signal based on the local oscillator signal and a first representation of a crosstalk signal while the RF output channel is disabled, the crosstalk signal being based on the local oscillator signal, and wherein the first measurement signal represents crosstalk based on the local oscillator signal when the RF output channel is disabled;
determining a second measurement signal based on the local oscillator signal and a second representation of the RF output signal while the RF output channel is enabled,
wherein the second representation of the RF output signal is generated based on the RF output channel being enabled; and
determining a phase value associated with the RF output channel based on the first measurement signal and the second measurement signal.

2. The method of claim 1, wherein determining the first measurement signal comprises:
generating a test signal based on the local oscillator signal and phase-shifting either the test signal or the first and the second representations of the RF output signal by a test phase;
mixing the test signal with the first representation of the crosstalk signal, while the RF output channel is disabled, thus generating a first mixer output signal; and
determining the first measurement signal by sampling the first mixer output signal for various test phases.

3. The method of claim 2, wherein determining the second measurement signal comprises:
mixing the test signal with the second representation of the RF output signal, while the RF output channel is enabled, thus generating a second mixer output signal; and
determining the second measurement signal by sampling the second mixer output signal for various test phases.

4. The method of claim 1, wherein determining the phase value comprises:
subtracting the first measurement signal, which represents the crosstalk, from the second measurement signal thus generating a difference signal; and
calculating the phase value based on the difference signal.

5. The method of claim 4, wherein calculating the phase value comprises:
calculating a spectral value associated with the difference signal, wherein the phase value is calculated from the spectral value.

6. The method of claim 1, wherein determining the phase value comprises:
calculating a first spectral value associated with the first measurement signal;
calculating a second spectral value associated with the second measurement signal; and
calculating the phase value based on a difference between the first spectral value and the second spectral value.

7. The method of claim 6, wherein the difference between the first spectral value and the second spectral value is a complex-valued number and the phase value is calculated as an argument of the complex-valued number.

8. The method of claim 1, wherein:
the RF output channel includes a phase shifter configured to control a phase of the RF output signal; and
the method further comprises controlling the phase shifter dependent on the determined phase value.

9. The method of claim 1, further comprising:
providing the local oscillator signal to a further RF output channel of the radar system, the further RF output channel being configured to generate, in an enabled state, a further RF output signal based on the local oscillator signal;
determining a third measurement signal based on the local oscillator signal and a representation of the further RF output signal while the further RF output channel is enabled and the RF output channel is disabled; and
determining a further phase value based on the first measurement signal and the third measurement signal.

10. The method of claim 9, further comprising:
adjusting a phase shift provided by the RF output channel and a phase shift provided by the further RF output channel dependent on the phase value and the further phase value.

11. The method of claim 9, wherein all further RF output channels of the radar system, including the further RF output channel, are disabled while determining the first measurement signal and the second measurement signal.

12. The method of claim 1, wherein the first and the second representations of the RF output signal is provided by a directional coupler included in the RF output channel.

13. A radar system, comprising:
a local oscillator providing a local oscillator signal to an RF output channel of a radar system, the RF output channel being configured to generate, when in an enabled state, an RF output signal based on the local oscillator signal;
a circuit configured to determine a first measurement signal based on the local oscillator signal and a first representation of a crosstalk signal while the RF output channel is in a disabled state, the crosstalk signal being based on the local oscillator signal, and wherein the first measurement signal represents crosstalk based on the local oscillator signal when the RF output channel is disabled, and the circuit is further configured to determine a second measurement signal based on the local oscillator signal and a second representation of the RF output signal while the RF output channel is in an enabled state,
wherein the second representation of the RF output signal is generated based on the RF output channel being enabled; and a processing circuit configured to determine a phase value based on the first measurement signal and the second measurement signal.

14. The system of claim 13, wherein the RF output channel includes a coupler that is configured to provide a scaled version of the RF output signal as the first representation of the crosstalk signal and the second representation of the RF output signal.

15. The system of claim 13, wherein the circuit includes:
a mixer configured to mix the local oscillator signal and the first representation of the crosstalk signal and mix the local oscillator signal and the second representation of the RF output signal; and
a phase shifter configured to phase shift, by a test phase, either the local oscillator signal or the first and the second representations of the RF output signal before arriving at the mixer.

16. The system of claim 15, wherein the circuit further includes an analog-to-digital converter configured to sample an output signal of the mixer for various test phases to generate the first measurement signal.

\* \* \* \* \*